(12) United States Patent
Matsumura et al.

(10) Patent No.: US 12,278,785 B2
(45) Date of Patent: Apr. 15, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 331 days.

(21) Appl. No.: 17/795,650

(22) PCT Filed: Feb. 4, 2020

(86) PCT No.: PCT/JP2020/004198
§ 371 (c)(1),
(2) Date: Jul. 27, 2022

(87) PCT Pub. No.: WO2021/156951
PCT Pub. Date: Aug. 12, 2021

(65) Prior Publication Data
US 2023/0075610 A1    Mar. 9, 2023

(51) Int. Cl.
*H04L 5/00* (2006.01)
*H04B 7/06* (2006.01)

(52) U.S. Cl.
CPC ......... *H04L 5/0064* (2013.01); *H04B 7/0626* (2013.01); *H04L 5/0051* (2013.01)

(58) Field of Classification Search
CPC ... H04B 7/0626; H04B 7/0691; H04L 5/0064; H04L 5/0051; H04L 5/0023; H04L 5/0048; H04L 5/0053; H04L 5/0057; H04W 16/28; H04W 24/10
USPC .......................................... 370/329
See application file for complete search history.

(56) References Cited

U.S. PATENT DOCUMENTS

| | | | |
|---|---|---|---|
| 2019/0306850 A1* | 10/2019 | Zhang | H04B 7/0465 |
| 2021/0184750 A1 | 6/2021 | Gao et al. | |
| 2022/0039099 A1* | 2/2022 | Fax?r | H04L 27/26025 |
| 2022/0166468 A1* | 5/2022 | Go | H04B 7/0404 |
| 2022/0255616 A1* | 8/2022 | Liu | H04W 72/51 |
| 2023/0078501 A1* | 3/2023 | Wang | H04L 1/0026 370/252 |

(Continued)

FOREIGN PATENT DOCUMENTS

WO    2019242027 A1    12/2019

OTHER PUBLICATIONS

Office Action issued in corresponding Japanese Application No. 2021-575139, mailed Feb. 20, 2024 (6 pages).

(Continued)

*Primary Examiner* — Rownak Islam
(74) *Attorney, Agent, or Firm* — Osha Bergman Watanabe & Burton LLP

(57) ABSTRACT

A terminal according to one aspect of the present disclosure includes: a receiving section that performs channel state information (CSI) measurement regarding a plurality of panels; and a control section that determines which results of the CSI measurement related to which panel are to be included in a CSI report. According to one aspect of the present disclosure, a panel specific CSI report can be appropriately used.

4 Claims, 19 Drawing Sheets

PANEL #1

PANEL #2

CANDIDATE BEAM

SELECTED BEAM

(56) References Cited

U.S. PATENT DOCUMENTS

2024/0172213 A1\* 5/2024 Mondal ................ H04W 72/23

OTHER PUBLICATIONS

Vivo: "Discussion on beam measurement, beam reporting and beam indication", 3GPP TSG RAN WG1 Meeting #90bis, R1-1717472; Prague, CZ, Oct. 9-13, 2017 (12 pages).
International Search Report issued in PCT/JP2020/004198 on Aug. 25, 2020 (1 page).
Written Opinion of the International Searching Authority issued in PCT/JP2020/004198 on Aug. 25, 2020 (3 pages).
Intel Corporation; "On multi-TRP/multi-panel transmission"; 3GPP TSG RAN WG1 Meeting #99, R1-1912222; Reno, USA; Nov. 18-22, 2019 (8 pages).
Vivo; "Further discussion on Multi-Beam Operation"; 3GPP TSG RAN WG1 #98, R1-1908167; Prague, CZ; Aug. 26-30, 2019 (12 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

FIG. 1A

```
CSI-ReportConfig ::=            SEQUENCE {
    reportConfigId              CSI-ReportConfigId,
    ...
    resourcesForChannelMeasurement        CSI-ResourceConfigId,
    csi-IM-ResourcesForInterference       CSI-ResourceConfigId      OPTIONAL,   -- Need R
    nzp-CSI-RS-ResourcesForInterference   CSI-ResourceConfigId      OPTIONAL,   -- Need R
    ...
}
```

FIG. 1B

```
CSI-ResourceConfig ::=          SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList  SEQUENCE (SIZE (1..maxNrofNZP-CSI-RS-ResourceSetsPerConfig)) OF NZP-CSI-RS-ResourceSetId OPTIONAL,
            csi-SSB-ResourceSetList     SEQUENCE (SIZE (1..maxNrofCSI-SSB-ResourceSetsPerConfig)) OF CSI-SSB-ResourceSetId OPTIONAL
        },
        csi-IM-ResourceSetList      SEQUENCE (SIZE (1..maxNrofCSI-IM-ResourceSetsPerConfig)) OF CSI-IM-ResourceSetId
    },
    resourceType                ENUMERATED { aperiodic, semiPersistent, periodic },
    ...
}
```

FIG. 2A

```
NZP-CSI-RS-ResourceSet ::=    SEQUENCE {
    nzp-CSI-RS-ResourceSetId       NZP-CSI-RS-ResourceSetId,
    nzp-CSI-RS-Resources           SEQUENCE (SIZE (1..maxNrofNZP-CSI-RS-ResourcesPerSet)) OF
                                      NZP-CSI-RS-ResourceId,
    ...
}

NZP-CSI-RS-Resource ::=    SEQUENCE {
    nzp-CSI-RS-ResourceId          NZP-CSI-RS-ResourceId,
    resourceMapping                CSI-RS-ResourceMapping,
    ...
    qcl-InfoPeriodicCSI-RS         TCI-StateId                OPTIONAL,     -- Cond Periodic
    ...
}
```

FIG. 2B

```
CSI-SSB-ResourceSet ::=    SEQUENCE {
    csi-SSB-ResourceSetId          CSI-SSB-ResourceSetId,
    csi-SSB-ResourceList           SEQUENCE (SIZE(1..maxNrofCSI-SSB-ResourcePerSet)) OF
                                      SSB-Index,
    ...
}

SSB-Index ::=    INTEGER (0..63)
```

```
TCI-State ::=          SEQUENCE {
     tci-StateId            TCI-StateId,
     qcl-Type1              QCL-Info,
     qcl-Type2              QCL-Info                         OPTIONAL,   -- Need R
     ...
}

QCL-Info ::=           SEQUENCE {
     cell                   ServCellIndex                    OPTIONAL,   -- Need R
     bwp-Id                 BWP-Id                           OPTIONAL,   -- Cond CSI-RS-Indicated
     referenceSignal        CHOICE {
          csi-rs                 NZP-CSI-RS-ResourceId,
          ssb                    SSB-Index
     },
     qcl-Type               ENUMERATED {typeA, typeB, typeC, typeD},
     ...
}
```

FIG. 3

```
CSI-ReportConfig ::=      SEQUENCE {
    reportConfigId            CSI-ReportConfigId,
    ...
    reportQuantity            CHOICE {
        none                      NULL,
        cri-RI-PMI-CQI            NULL,
        cri-RI-i1                 NULL,
        cri-RI-i1-CQI             SEQUENCE {
            pdsch-BundleSizeForCSI    ENUMERATED {n2, n4}    OPTIONAL
        },
        cri-RI-CQI                NULL,
        cri-RSRP                  NULL,
        ssb-Index-RSRP            NULL,
        cri-RI-LI-PMI-CQI         NULL
    },
    ...
    groupBasedBeamReporting   CHOICE {
        enabled                   NULL,
        disabled                  SEQUENCE {
            nrofReportedRS            ENUMERATED {n1, n2, n3, n4}    OPTIONAL -- Need S
        }
    },
    ...
}                                                              OPTIONAL -- Need R
```

FIG. 5

| panels |
|---|
| Panel#1 -> deactivated |
| Panel#2 -> activated |
| Panel#3 -> activated |
| Panel#4 -> deactivated |

| Indication in CSI report | panel |
|---|---|
| 0 | Panel#1 |
| 1 | Panel#2 |
| 2 | Panel#3 |
| 3 | Panel#4 |

FIG. 15B

| Indication in CSI report | panel |
|---|---|
| 0 | Panel#2 |
| 1 | Panel#3 |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, Rel. 17 NR), uplink (UL) beam selection for a user terminal (User Equipment (UE)) including a plurality of panels (multi-panel) has been under study.

When the UE has capability of beam correspondence, activation/deactivation, switching, and the like of the panels of the UE may be determined based on channel state information (CSI) measurement of the downlink. To achieve this, it is preferable that the UE be able to report a panel specific CSI report.

However, the study of the panel specific CSI report has not yet been under development. Unless the panel specific CSI report can be used, an appropriate CSI report cannot be performed, which may lead to deterioration in communication throughput.

In the light of this, the present disclosure has one object to provide a terminal, a radio communication method, and a base station that enable appropriate use of a panel specific CSI report.

Solution to Problem

A terminal according to one aspect of the present disclosure includes: a receiving section that performs channel state information (CSI) measurement regarding a plurality of panels; and a control section that determines which results of the CSI measurement related to which panel are to be included in a CSI report.

Advantageous Effects of Invention

According to one aspect of the present disclosure, a panel specific CSI report can be appropriately used.

BRIEF DESCRIPTION OF DRAWINGS

FIGS. 1A and 1B are each a diagram to show an example of an RRC information element related to a CSI report configuration and a CSI resource configuration;

FIGS. 2A and 2B are each a diagram to show an example of an RRC information element related to an NZP CSI-RS resource set and a CSI-SSB resource set;

FIG. 3 is a diagram to show an example of an RRC information element related to a TCI state;

FIG. 5 is an extract of an RRC information element "CSI-ReportConfig";

FIG. 14 is a configuration example showing whether each panel is enabled or disabled;

FIG. 15A is the first example showing mapping of panel IDs of a CSI report target; FIG. 15B is the second example showing mapping of the panel IDs of the CSI report target;

DESCRIPTION OF EMBODIMENTS (CSI)

Figure 4:
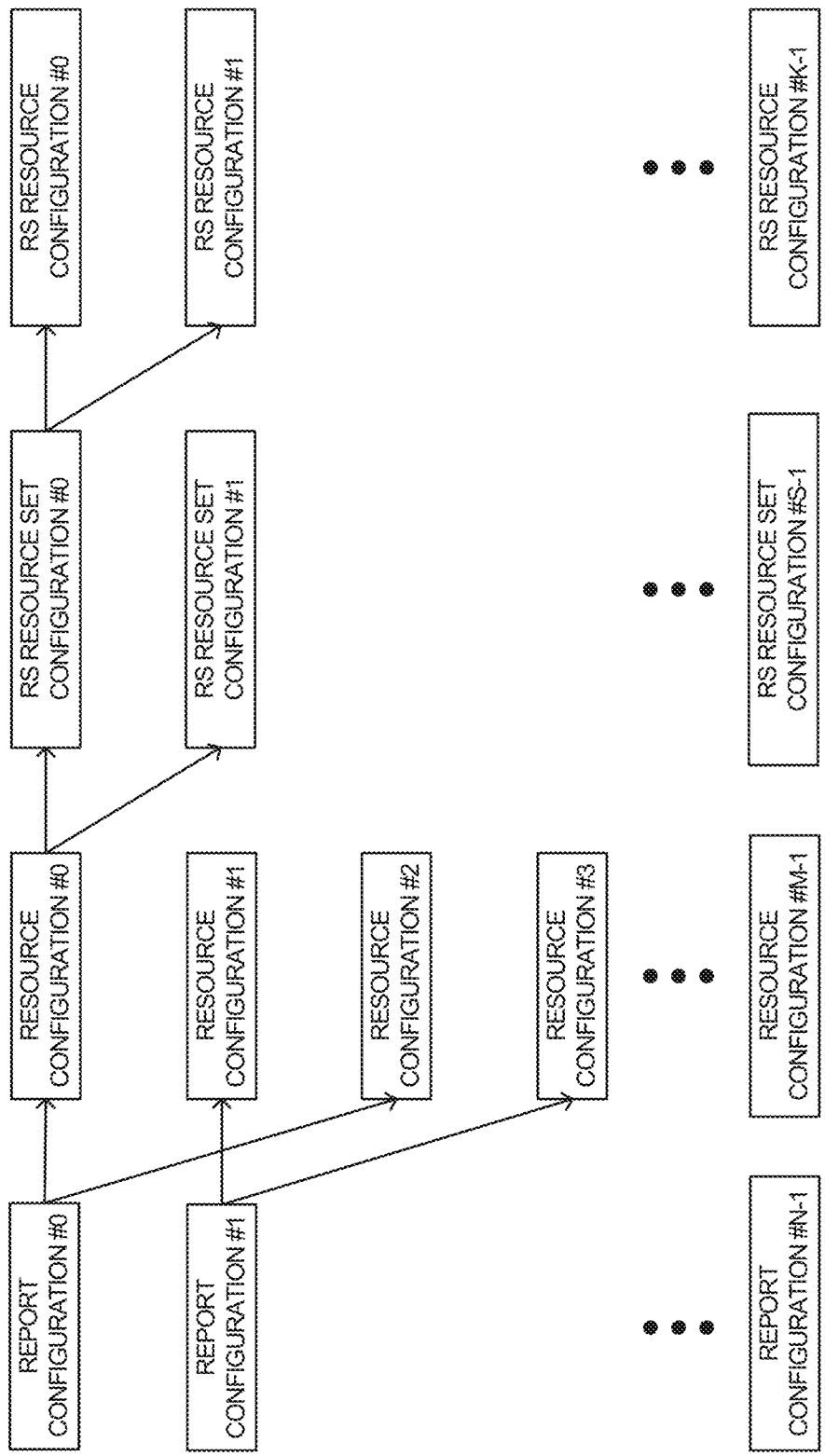
FIG. 4 is a diagram to show an example of association of configurations related to CSI according to Rel. 15 NR.

In NR, a UE measures a channel state by using a reference signal (or resources for the reference signal), and feeds back (reports) channel state information (CSI) to a network (for example, a base station).

The UE may measure the channel state by using at least one of a channel state information reference signal (CSI-RS), a synchronization signal/broadcast channel (SS/PBCH) block, a synchronization signal (SS), a demodulation reference signal (DMRS), and the like.

A CSI-RS resource may include at least one of a non-zero power (NZP) CSI-RS resource, a zero power (ZP) CSI-RS resource, and a CSI interference measurement (CSI-IM) resource.

A resource for measuring a signal component for the CSI may be referred to as a signal measurement resource (SMR) or a channel measurement resource (CMR). The SMR (CMR) may include, for example, an NZP CSI-RS resource, an SSB, and the like for channel measurement.

A resource for measuring an interference component for the CSI may be referred to as an interference measurement resource (IMR). The IMR may include, for example, at least one of an NZP CSI-RS resource, an SSB, a ZP CSI-RS resource, and a CSI-IM resource for interference measurement.

The SS/PBCH block is a block including a synchronization signal (for example, a primary synchronization signal (PSS) or a secondary synchronization signal (SSS)) and a PBCH (and a corresponding DMRS), and may be referred to as an SS block (SSB) or the like.

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), an L1-RSRP (reference signal received power in layer 1 (Layer 1 Reference Signal Received Power)), L1-RSRQ (Reference Signal Received Quality), an L1-SINR (Signal to Interference plus Noise Ratio), an L1-SNR (Signal to Noise Ratio), and the like.

The CSI may include a plurality of parts. CSI part 1 may include information (for example, the RI) having relatively a small number of bits. CSI part 2 may include information (for example, the CQI) having relatively a large number of bits, such as information determined based on CSI part 1.

Further, the CSI may be categorized into some CSI types. Depending on the CSI type, an information type, size, and the like to be reported may be different. For example, a CSI type that is configured for performing communication using a single beam (also referred to as type 1 (type I) CSI, CSI for single beam, or the like) and a CSI type that is configured for performing communication using a multi-beam (also referred to as type 2 (type II) CSI, CSI for multi-beam, or the like) may be defined. The usage of the CSI type is not limited to these.

As a feedback method of the CSI, a periodic CSI (P-CSI) report, an aperiodic CSI (A-CSI) report, a semi-persistent CSI (SP-CSI) report, and the like have been under study.

The UE may receive reporting of CSI measurement configuration information by using higher layer signaling, physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

The CSI measurement configuration information may be configured by using, for example, an RRC information element "CSI-MeasConfig". The CSI measurement configuration information may include CSI resource configuration (setting) information (RRC information element "CSI-ResourceConfig"), CSI report configuration (setting) information (RRC information element "CSI-ReportConfig"), and the like. The CSI resource configuration information is related to resources for CSI measurement, and the CSI report configuration information is related to how the UE carries out the CSI report.

FIGS. 1A and 1B are each a diagram to show an example of an RRC information element related to a CSI report configuration and a CSI resource configuration. In the present example, an extract of fields (which may be referred to as parameters) included in the information element is shown. FIGS. 1A and 1B are described by using the notation of ASN.1 (Abstract Syntax Notation One). Note that figures related to other RRC information elements (or RRC parameters) in the present disclosure are described with a similar notation as well.

As shown in FIG. 1A, the CSI report configuration information ("CSI-ReportConfig") includes resource information for channel measurement ("resourcesForChannelMeasurement"). Further, the CSI report configuration information may also include resource information for interference measurement (for example, NZP CSI-RS resource information for interference measurement ("nzp-CSI-RS-ResourcesForInterference"), CSI-IM resource information for interference measurement ("csi-IM-ResourcesForInterference"), or the like). These pieces of resource information each correspond to an ID (Identifier) of the CSI resource configuration information ("CSI-ResourceConfigId").

Note that, regarding the ID of the CSI resource configuration information (which may be referred to as a CSI resource configuration ID) corresponding to each piece of resource information, one or a plurality of IDs may be the same value or may be values different from each other.

As shown in FIG. 1B, the CSI resource configuration information ("CSI-ResourceConfig") may include a CSI resource configuration information ID, CSI-RS resource set list information ("csi-RS-ResourceSetList"), a resource type ("resourceType"), and the like. The CSI-RS resource set list may include at least one of information of the NZP CSI-RS and the SSB for measurement ("nzp-CSI-RS-SSB") and CSI-IM resource set list information ("csi-IM-ResourceSetList").

The resource type represents a behavior of the time domain of the CSI-RS resource configuration, and "aperiodic", "semi-persistent", and "periodic" may be configured. The CSI-RSs corresponding to the above may be referred to as an A-CSI-RS, an SP-CSI-RS, and a P-CSI-RS, respectively.

Note that the resources for channel measurement may be, for example, used for calculation of the CQI, the PMI, the L1-RSRP, and the like. Further, the resources for interference measurement may be used for calculation of the L1-SINR, the L1-SNR, and the L1-RSRQ, as well as an indicator related to other interference.

When interference measurement is performed with CSI-IM, each CSI-RS for channel measurement may be associated with the CSI-IM resource from the point of view of resources, based on the order of the CSI-RS resources and the CSI-IM resources in a corresponding resource set.

"nzp-CSI-RS-SSB" may include NZP CSI-RS resource set list information ("nzp-CSI-RS-ResourceSetList") and SSB resource set list information for CSI measurement ("csi-SSB-ResourceSetList"). These pieces of list information each correspond to one or more NZP CSI-RS resource set IDs ("NZP-CSI-RS-ResourceSetId") and CSI-SSB resource set IDs ("CSI-SSB-ResourceSetId"), and may be used for identifying resources of a measurement target.

FIGS. 2A and 2B are each a diagram to show an example of an RRC information element related to an NZP CSI-RS resource set and a CSI-SSB resource set.

As shown in FIG. 2A, NZP CSI-RS resource set information ("NZP-CSI-RS-ResourceSet") includes an NZP CSI-RS resource set ID and one or more NZP CSI-RS resource IDs ("NZP-CSI-RS-ResourceId").

The NZP CSI-RS resource information ("NZP-CSI-RS-Resource") may include an NZP CSI-RS resource ID, and an ID ("TCI-stateId") of a transmission configuration indication state (TCI state). The TCI state will be described later.

As shown in FIG. 2B, CSI-SSB resource set information ("CSI-SSB-ResourceSet") includes a CSI-SSB resource set ID and one or more pieces of SSB index information ("SSB-Index"). The SSB index information is, for example, an integer of 0 or greater or 63 or less, and may be used for identifying the SSB in an SS burst.

FIG. 3 is a diagram to show an example of an RRC information element related to the TCI state.

The TCI state is information related to quasi-co-location (QCL) of a channel or a signal, and may also referred to as a spatial reception parameter, spatial relation information (spatial relation info), or the like. The TCI state may be configured or specified for the UE for each channel or for each signal.

As shown in FIG. 3, TCI state information ("TCI-State") may include a TCI state ID and one or more pieces of QCL information ("QCL-Info"). The QCL information may include at least one of information related to a reference signal of a QCL source (RS related information ("referenceSignal")) and information indicating QCL type (QCL type information ("qcl-Type")). The RS related information may include information such as an index of the RS (for example, the NZP CSI-RS resource ID or the SSB index), an index of the serving cell, and an index of a BWP (Bandwidth Part) at which the RS is located.

Regarding at least one of a signal and a channel (referred to as a signal/channel), the UE may control reception processing (for example, at least one of reception, demapping, demodulation, decoding, determination of a receive beam, and the like), transmission processing (for example, at least one of transmission, mapping, modulation, coding, determination of a transmit beam, and the like), and the like, based on the TCI state that corresponds to the TCI state ID associated with the signal/channel.

As shown in FIG. 2A, regarding the P-CSI-RS, a related TCI state may be configured by RRC. Regarding the SP-CSI-RS and the A-CSI-RS, a related TCI state may be determined based on higher layer signaling, physical layer signaling, or a combination of these.

To sum up the description provided in the above, the CSI report configuration (which may be simply referred to as a report configuration) is associated with one or more CSI resource configurations by using an ID of the CSI resource configuration information. Further, CSI resource configuration (which may be simply referred to as a resource configuration) is associated with a configuration of a configuration of one or more CSI-RS resource sets by using the CSI-RS resource set ID. Further, the configuration of the CSI-RS resource set (which may be simply referred to as an RS resource set configuration) is associated with a configuration of one or more CSI-RS resources (which may be simply referred to as RS resource configurations) by using the CSI-RS resource ID.

FIG. 4 is a diagram to show an example of association of configurations related to the CSI according to Rel. 15 NR. In the present example, for the UE, report configurations #0 to #N−1, resource configurations #0 to #M−1, RS resource set configurations #0 to #S−1, and RS resource configurations #0 to #K−1 are configured.

Report configuration #0 corresponds to, for example, resource configurations #0 and #2. Report configuration #1 corresponds to, for example, resource configurations #1 and #3.

Further, resource configuration #0 corresponds to, for example, RS resource set configurations #0 and #1. Further, RS resource set configuration #0 corresponds to, for example, RS resource configurations #0 and #1.

Note that one RS resource configuration may be associated with one or more RS resource set configurations. One RS resource set configuration may be associated with one or more resource configurations. One resource configuration may be associated with one or more report configurations.

(Beam Management)

In Rel. 15 NR, a method of beam management (BM) has been under study. In the beam management, performing beam selection based on L1-RSRP reported by the UE has been under study. To change (switch) beams of a certain signal/channel may correspond to changing at least one of the TCI state of the signal/channel and QCL assumption.

The UE may report (transmit) measurement results for beam management by using an uplink control channel (Physical Uplink Control Channel (PUCCH)) or an uplink shared channel (Physical Uplink Shared Channel (PUSCH)). The measurement results may be, for example, the CSI including at least one of L1-RSRP, L1-RSRQ, L1-SINR, L1-SNR, and the like.

The measurement results (for example, the CSI) reported for beam management may be referred to as beam measurement, a beam measurement report, a beam report, beam report CSI, or the like.

The CSI measurement for beam report may include interference measurement. The UE may measure channel quality, interference, or the like by using the resources for CSI measurement and derive the beam report.

In the beam report, results of at least one of channel quality measurement and interference measurement may be included. Results of channel quality measurement may include, for example, L1-RSRP. Results of interference measurement may include an indicator related to L1-SINR, L1-SNR, L1-RSRQ, and other interference (for example, any indicator that is not L1-RSRP) or the like.

The CSI report configuration information in consideration of beam management according to NR at present will be described with reference to FIG. 5. FIG. 5 is an extract of the RRC information element "CSI-ReportConfig". FIG. 5 extracts a part different from the same CSI report configuration information (CSI-ReportConfig) as in FIG. 1A.

The CSI report configuration information may include "report quantity" (which may be represented as an RRC parameter "reportQuantity") being information of a parameter reported with one report instance (for example, one piece of CSI). The report quantity is defined as a type of an ASN.1 object referred to as a "choice type (choice)". Thus, one of parameters (cri-RSRP, ssb-Index-RSRP, and the like) defined as the report quantity is configured.

The UE for which a higher layer parameter (for example, an RRC parameter "groupBasedBeamReporting") included in the CSI report configuration information is configured to be enabled may include, in a beam report, a plurality of resource IDs for beam measurement (for example, the SSBRI or the CRI) and a plurality of measurement results (for example, L1-RSRP) corresponding to these, regarding each report configuration.

The UE for which the number of report target RS resources, which is one or more, is configured by a higher layer parameter (for example, an RRC parameter "nrofReportedRS") included in the CSI report configuration information may include, in a beam report, one or more resource IDs for beam measurement and one or more measurement results (for example, L1-RSRP) corresponding to these, regarding each report configuration.

In Rel. 15 NR, out of the report quantity, cri-RSRP and ssb-Index-RSRP are related to beam management. The UE for which cri-RSRP is configured reports the CRI and L1-RSRP corresponding to the CRI. The UE for which ssb-Index-RSRP is configured reports the SSBRI and L1-RSRP corresponding to the CRI.

Figure 6:
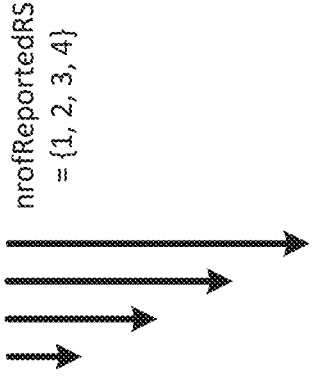
FIG. 6 is a diagram to show an example of a CSI report according to Rel. 15 NR.

FIG. 6 is a diagram to show an example of the CSI report according to Rel. 15 NR. FIG. 6 shows mapping order of CSI fields included in one CSI report (n-th CSI report #n) for a CSI/RSRP or SSBRI/RSRP report, which is defined in Table 6.3.1.1.2-8 of 3GPP TS 38.212 V15.7.0.

The CSI report of FIG. 6 can include one or more pairs of the CRI/SSBRI and the RSRP. The number of these pairs may be configured by using higher layer parameter (for example, the RRC parameter "nrofReportedRS") indicating the number of reference signal resources of a report target. In a case where nrofReportedRS=X (X={1, 2, 3, 4}), a pair of the CRI/SSBRI and the RSRP having the X-th index (#X) or smaller may be included in the CSI report.

Note that RSRP #1 may be a field of a certain number of bits (for example, m bits) indicating the L1-RSRP having the largest measurement value, and differential RSRPs #2 to #4 may be a field having bits (for example, n bits) less than the certain number indicating each RSRP by using a difference from the value of RSRP #1. In Rel. 15 NR, m=7 and n=4.

Note that, in NR of Rel. 16 or later versions, nrofReportedRS may be a value of 4 or greater, and Y may be 4 or greater as well. In the CSI report, four or more pairs of the CRI/SSBRI and the RSRP may be included. For example, m and n described above are not limited to 7 and 4, respectively.

(Multi-Panel)

For future radio communication systems (for example, Rel. 17 NR), uplink (UL) beam selection for a user terminal (User Equipment (UE)) including a plurality of panels (multi-panel) has been under study.

When the UE has capability of beam correspondence (BC) (for example, an RRC parameter "beamCorrespondenceWithoutUL"), the UE may autonomously determine an appropriate UL beam, based on DL measurement (for example, DL reference signal measurement) without UL beam sweeping.

Further, when the UE has capability of beam correspondence, it is preferable that the UE be able to report a panel specific CSI report.

However, the study of the panel specific CSI report has not yet been under development. For example, the study as to based on what sort of criterion or measurement criterion (metric) the UE selects the beam or the panel to be reported has not yet been under development. Unless the panel specific CSI report can be used, an appropriate CSI report cannot be performed, which may lead to deterioration in communication throughput.

In the light of this, the inventors of the present invention came up with the idea of a method for appropriately using the panel specific CSI report.

Embodiments according to the present disclosure will be described in detail below with reference to the drawings. A radio communication method according to each embodiment may be individually applied, or may be applied in combination.

Note that, in the present disclosure, a panel, an Uplink (UL) transmission entity, a TRP, spatial relation, a control resource set (CORESET), a PDSCH, a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), and the like may be interchangeably interpreted as each other. For example, a panel Identifier (ID) and a panel may be interchangeably interpreted as each other. A TRP ID and a TRP may be interchangeably interpreted as each other.

In the following embodiments, "to select a beam" may be interpreted as "to select a beam to be reported", "to select CSI related to a beam as a target to be included in one (or a plurality of) CSI report(s)", or the like. Further, in the present disclosure, "A/B" may mean "at least one of A and B".

(Radio Communication Method)

Embodiment 1

In Embodiment 1, the UE selects N best beams from all of the panels.

"N" in the above may be defined in a specification in advance, or may be configured by using higher layer signaling (for example, RRC signaling) or the like.

In the present disclosure, the "quality" of the beam may mean that the strength of the beam is high. For example, the "quality" of the beam may mean that RSRP (which may be interpreted as L1-RSRP) is high, may mean that SINR (which may be interpreted as L1-SINR) is high, or may mean that a value in consideration of a combination of the RSRP and the SINR (for example, a weighted sum of the RSRP and the SINR) is high.

Figure 7:
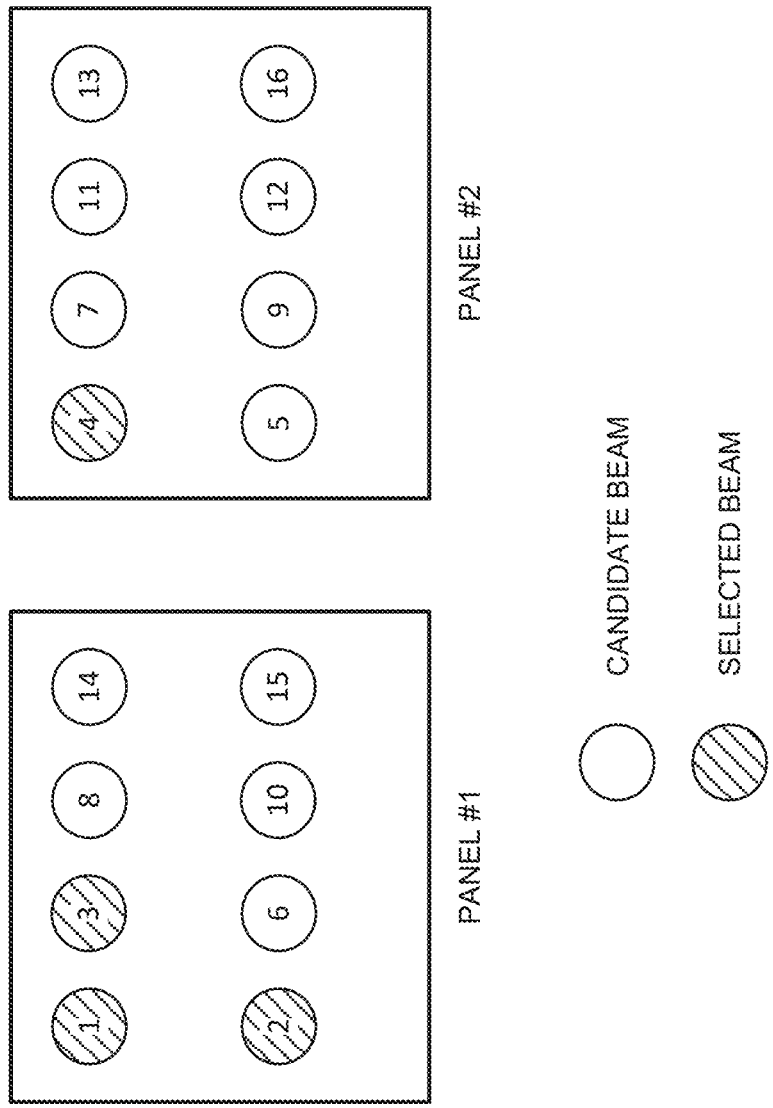
FIG. 7 is a diagram to show an example of report beam selection of the UE according to Embodiment 1.

FIG. 7 is a diagram to show an example of report beam selection of the UE according to Embodiment 1. In the present example, it is assumed that the UE has two panels (panels #1 and #2), and has measurement results of eight candidate beams regarding each of the panels.

The number provided for each candidate beam of FIG. 7 indicates strength of the beam (for example, the RSRP or the SINR) out of all of the candidate beams of all of the panels. The number is hereinafter also referred to as a strength value, a quality value, or the like. It is indicated that, as the strength value is smaller, the strength of the beam is higher (or the quality is better). Note that there may be a plurality of same strength values.

In the present example, N (N=4) beams are selected. Note that, unless otherwise specifically noted, the description in the above related to the figures applies to the subsequent figures as well.

In the example of FIG. 7, the UE selects the beams having the strength value of 1 to 4, that is, three beams from panel #1 and one beam from panel #2.

The UE may report a CSI report related to the selected beam to the network. The CSI report may include CSI (for example, the L1-RSRP, the CRI, or the SSBRI) related to the selected one or plurality of (for example, all) beam(s). The CSI report may include information (for example, the panel ID) corresponding to the selected beam. Regarding the reporting of the CSI report related to the selected beam, the same may hold true in the following embodiments as well.

According to Embodiment 1 described above, the best beams selected from all of the panels can be reported. The base station can appropriately determine appropriate beams and panels, based on the CSI report.

Embodiment 2

In Embodiment 2, the UE selects one panel, and selects N best beams in the one selected panel.

"N" in the above may be defined in a specification in advance, or may be configured by using higher layer signaling (for example, RRC signaling) or the like.

The UE may determine the one panel as follows:

(Embodiment 2.1) The best beam of each panel is compared, and the panel having better beams is determined.

(Embodiment 2.2) The average value of X best beams of each panel is compared, and the panel having a better one of the average values is determined.

Regarding the determined panel, the UE compares the beams in the panel, and determines M better beams as the beams of the panel.

Figure 8:
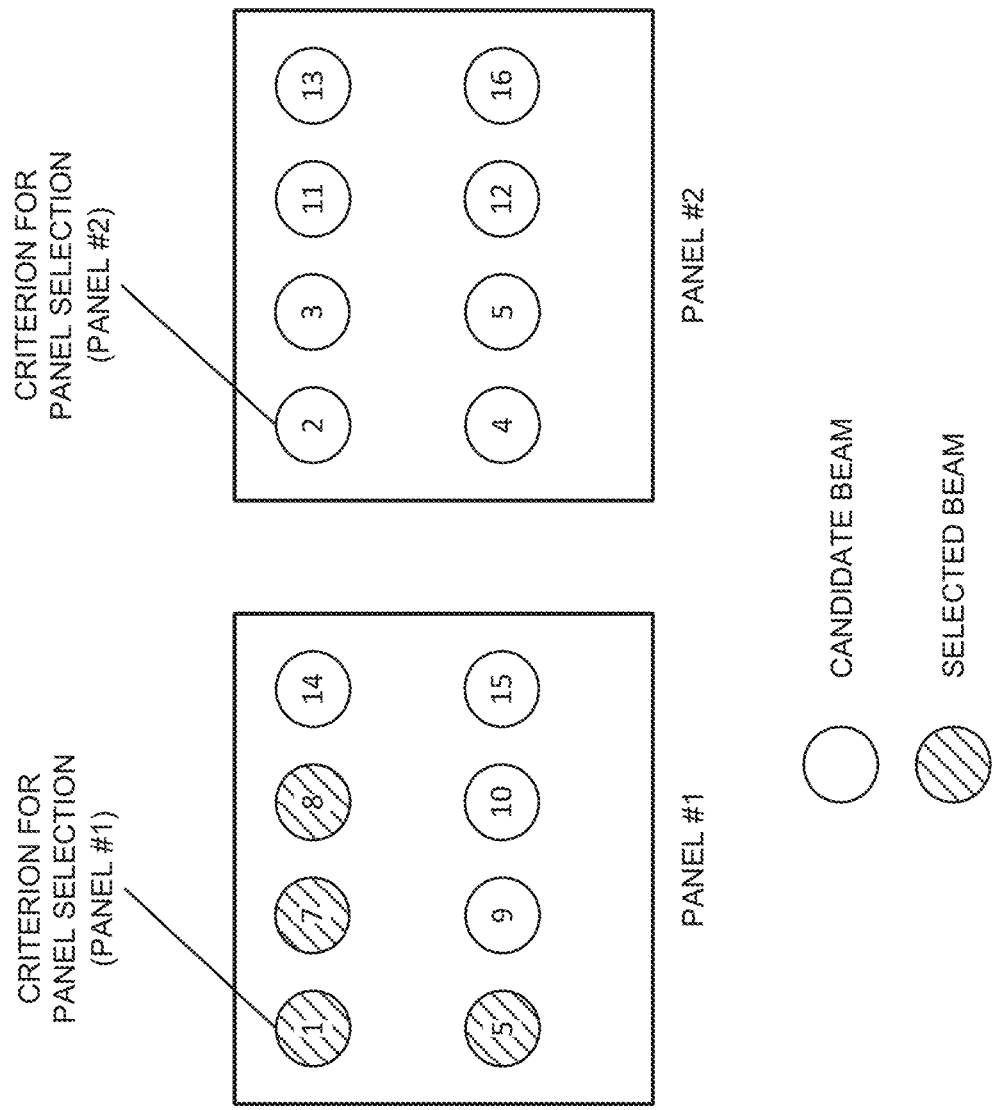
FIG. 8 is a diagram to show an example of report beam selection of the UE according to Embodiment 2.1.

FIG. 8 is a diagram to show an example of report beam selection of the UE according to Embodiment 2.1. In the present example, the strength value of the best beam of panel #1 is 1 (shown as "criterion (panel #1) for panel selection"), and the strength value of the best beam of panel #2 is 2 (shown as "criterion (panel #2) for panel selection"). Note that, in the subsequent figures as well, the panel or the criterion (comparison target) for CRI/SSBRI selection is shown.

The UE determines that the panel having better beams is panel #1. Further, the UE selects N (N=4) best beams (the beams having the strength value of 1, 5, 7, and 8) in selected panel #1.

In Embodiment 2.2, regarding "X" in the above, X may be N, may be defined in a specification in advance, or may be configured by using higher layer signaling (for example, RRC signaling) or the like.

Figure 9:
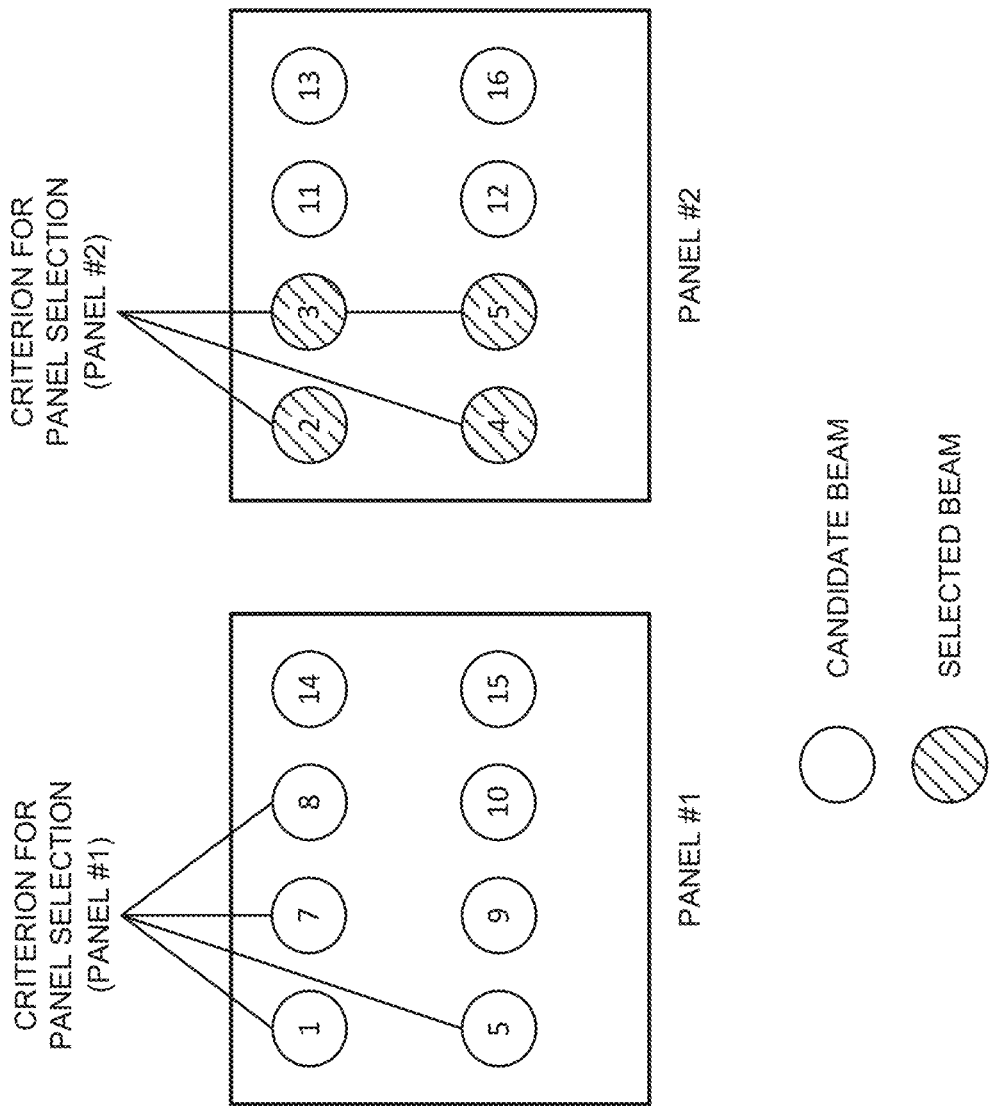
FIG. 9 is a diagram to show an example of report beam selection of the UE according to Embodiment 2.2.

FIG. 9 is a diagram to show an example of report beam selection of the UE according to Embodiment 2.2. In the present example, it is assumed that X=4. The UE compares the average value of the strengths of four best beams (the beams having the strength value of 1, 5, 7, and 8) of panel #1 and the average value of the strengths of four best beams (the beams having the strength value of 2, 3, 4, and 5) of panel #2. In the present example, it is determined that the panel having the better best average value of the four beams is panel #2.

The UE selects N (N=4) best beams (the beams having the strength value of 2, 3, 4, and 5) in selected panel #2.

According to Embodiment 2 described in the above, the best beams can be reported regarding one panel that is assumed to be the best. The base station can appropriately determine appropriate beams and panels, based on the CSI report.

Embodiment 3

In Embodiment 3, the UE selects K best panels, and selects M best beams in each panel.

"K" and "M" in the above may be defined in a specification in advance, or may be configured by using higher layer signaling (for example, RRC signaling) or the like.

The UE may determine the K best panels as follows.

(Embodiment 3.1) The best beam of each panel is compared, and the panel having K better beams is determined.

(Embodiment 3.2) The average value of X best beams of each panel is compared, and K panels having a better one of the average values are determined.

Regarding the determined panel, the UE compares the beams in the panel, and determines M better beams as the beams of the panel.

Figure 10:
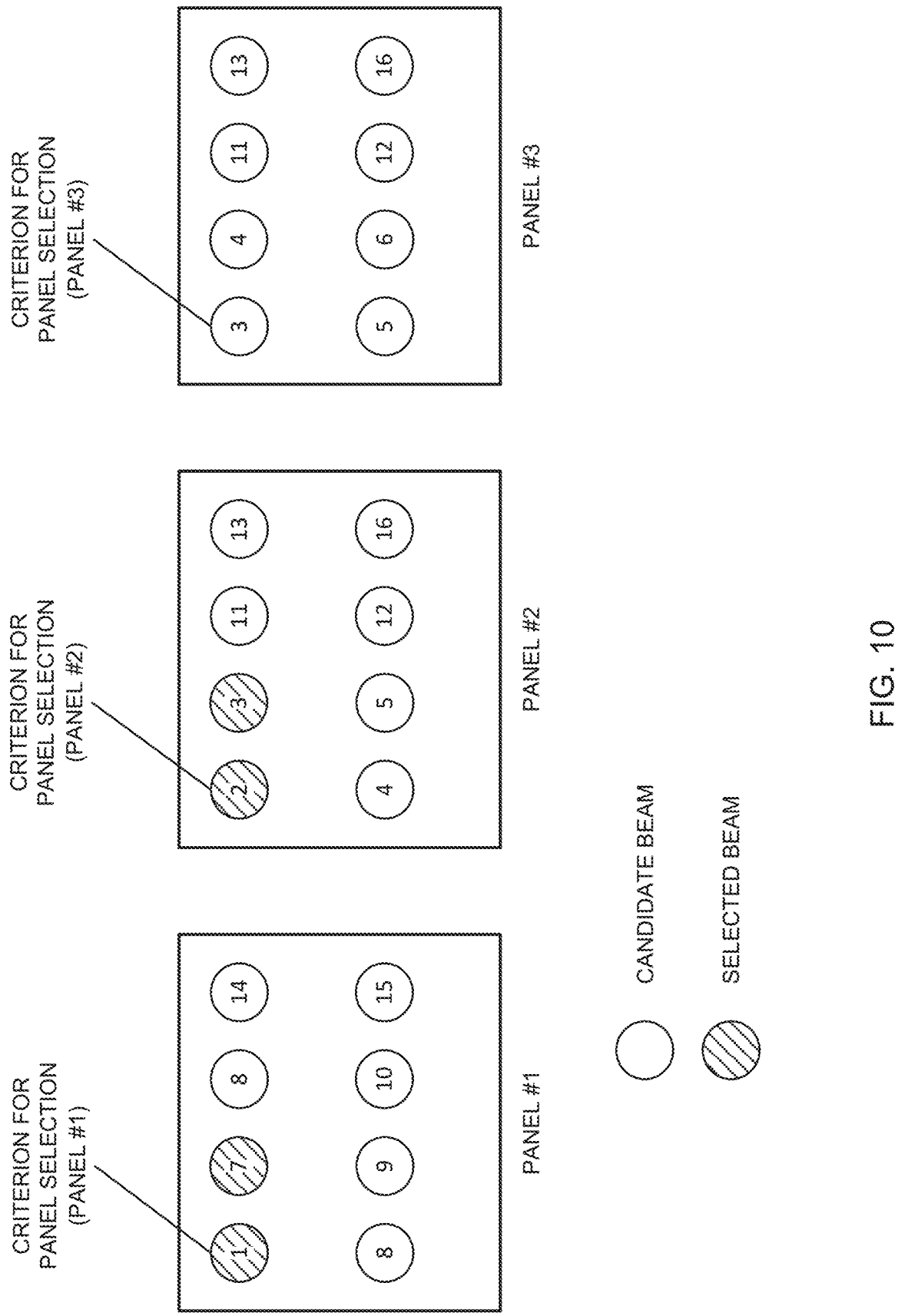
FIG. 10 is a diagram to show an example of report beam selection of the UE according to Embodiment 3.1.

FIG. 10 is a diagram to show an example of report beam selection of the UE according to Embodiment 3.1. In the subsequent figures, it is assumed that the UE has three panels (panels #1, #2, and #3), and has measurement results of eight candidate beams regarding each of the panels. Further, in the present example, it is assumed that K=2 and M=2.

In the present example, the strength value of the best beam of panel #1 is 1, the strength value of the best beam of panel #2 is 2, and the strength value of the best beam of panel #3 is 3. Thus, the UE determines that K (K=2) panels having better beams are panels #1 and #2.

The UE selects M (M=2) best beams (the beams having the strength value of 1 and 7) in selected panel #1, and selects M (M=2) best beams (the beams having the strength value of 2 and 3) in selected panel #2.

In Embodiment 3.2, regarding "X" in the above, X may be M, may be defined in a specification in advance, or may be configured by using higher layer signaling (for example, RRC signaling) or the like.

Figure 11:
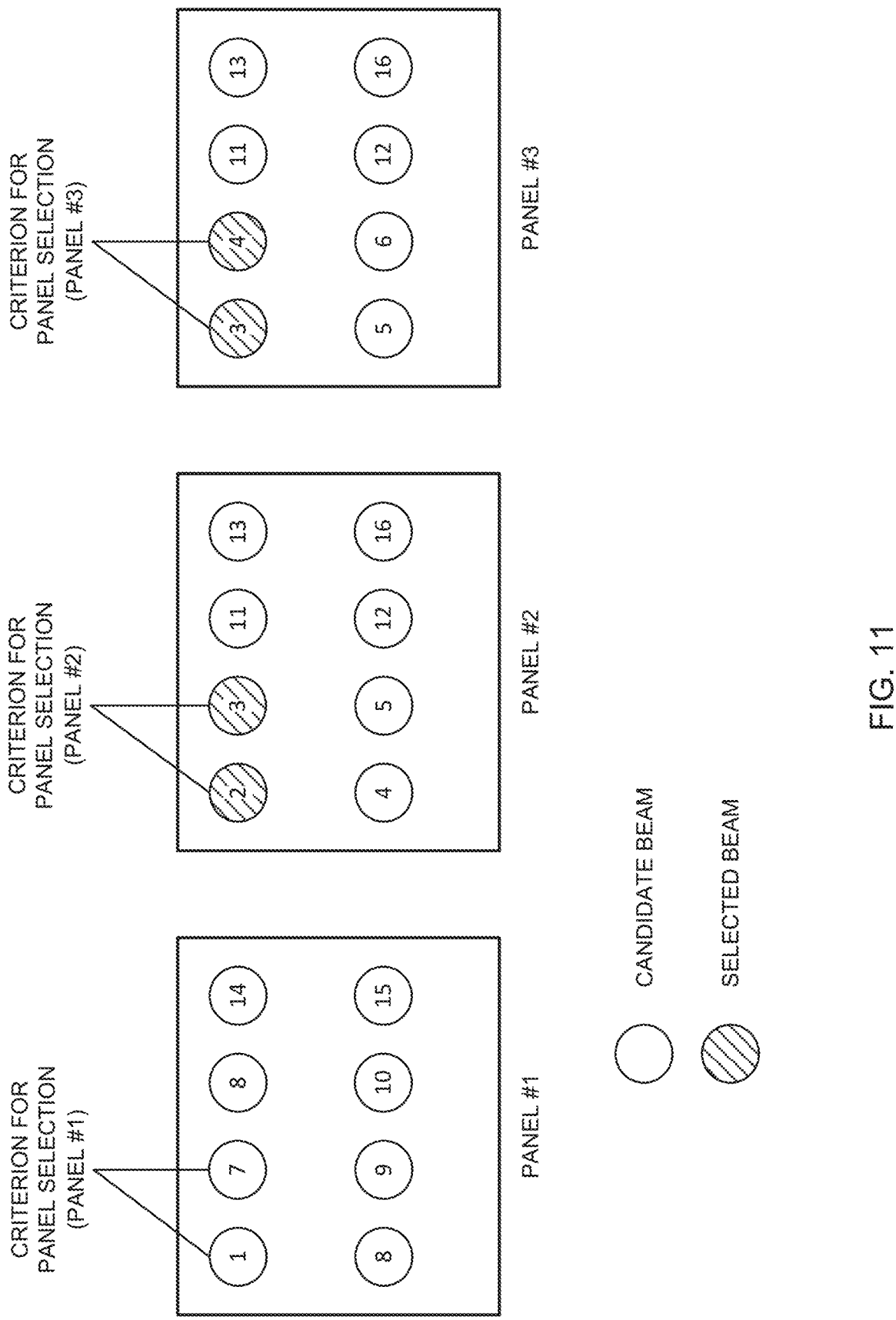
FIG. 11 is a diagram to show an example of report beam selection of the UE according to Embodiment 3.2.

FIG. 11 is a diagram to show an example of report beam selection of the UE according to Embodiment 3.2. In the present example, it is assumed that X=2. The UE compares the average value of the strengths of two best beams (the beams having the strength value of 1 and 7) of panel #1, the average value of the strengths of two best beams (the beams having the strength value of 2 and 3) of panel #2, and the average value of the strengths of two best beams (the beams having the strength value of 3 and 4) of panel #3. In the present example, it is determined that K (K=2) panels having the better best average value of the X (X=2) beams are panels #2 and #3.

The UE selects M (M=2) best beams (the beams having the strength value of 2 and 3) in selected panel #2, and selects M (M=2) best beams (the beams having the strength value of 3 and 4) in selected panel #3.

According to Embodiment 3 described in the above, the best beams can be reported regarding K panels that are assumed to be the best. The base station can appropriately determine appropriate beams and panels, based on the CSI report.

Embodiment 4

In Embodiment 4, the UE selects M best CRIs/SSBRIs, and selects K best panels for each of the CRIs/SSBRIs.

"K" and "M" in the above may be defined in a specification in advance, or may be configured by using higher layer signaling (for example, RRC signaling) or the like.

The UE may determine the M best CRIs/SSBRIs as follows.

(Embodiment 4.1) The best beam of each CRI/SSBRI is compared, and M CRIs/SSBRIs having better beams are determined.

(Embodiment 4.2) The average value of X best beams of each CRI/SSBRI is compared, and M CRIs/SSBRIs having a better one of the average value are determined.

Regarding the determined CRIs/SSBRIs, the UE compares the beams of each panel, and determines K better panels.

Figure 12:
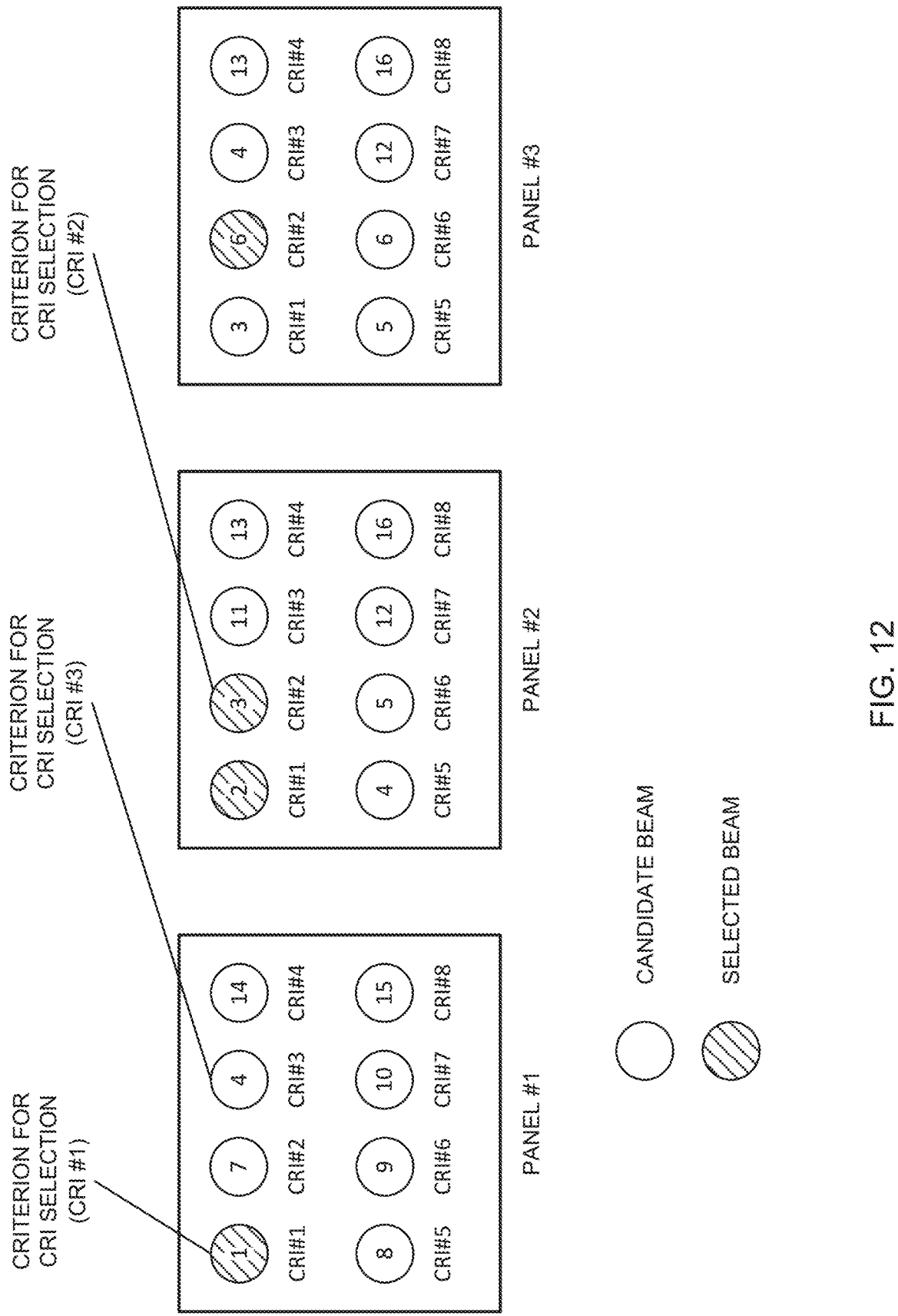
FIG. 12 is a diagram to show an example of report beam selection of the UE according to Embodiment 4.1.

FIG. 12 is a diagram to show an example of report beam selection of the UE according to Embodiment 4.1. In the present example, it is assumed that K=2 and M=2. Further, a value of a corresponding CRI is shown below each strength value. The present example shows an example in which CRIs #1 to #8 are configured as measurement targets regarding each panel, but this is not restrictive. The number of CRIs of the measurement targets of each panel may be different, and the same CRI need not necessarily be included in the measurement targets of each panel.

In the present example, the best beam of CRI #1 is the beam of panel #1 having the strength value of 1, the best beam of CRI #2 is the beam of panel #2 having the strength value of 3, and the best beam of CRI #3 is the beam of panel #1 or #3 having the strength value of 4 (CRI #4 and the following CRIs are as shown in the figure, and thus description thereof is omitted). The UE compares the best beams of CRIs #1 to #8, and determines that M (M=2) CRIs having better beams are CRIs #1 and #2.

Regarding selected CRI #1, the UE compares the strength value (=1) of panel #1, the strength value (=2) of panel #2, and the strength value (=3) of panel #3, and selects the beams of K (K=2) best panels (the beam of panel #1 having the strength value 1 and the beam of panel #2 having the strength value 2).

Regarding selected CRI #2, the UE compares the strength value (=7) of panel #1, the strength value (=3) of panel #2, and the strength value (=6) of panel #3, and selects the beams of K (K=2) best panels (the beam of panel #2 having the strength value 3 and the beam of panel #3 having the strength value 6).

Figure 13:
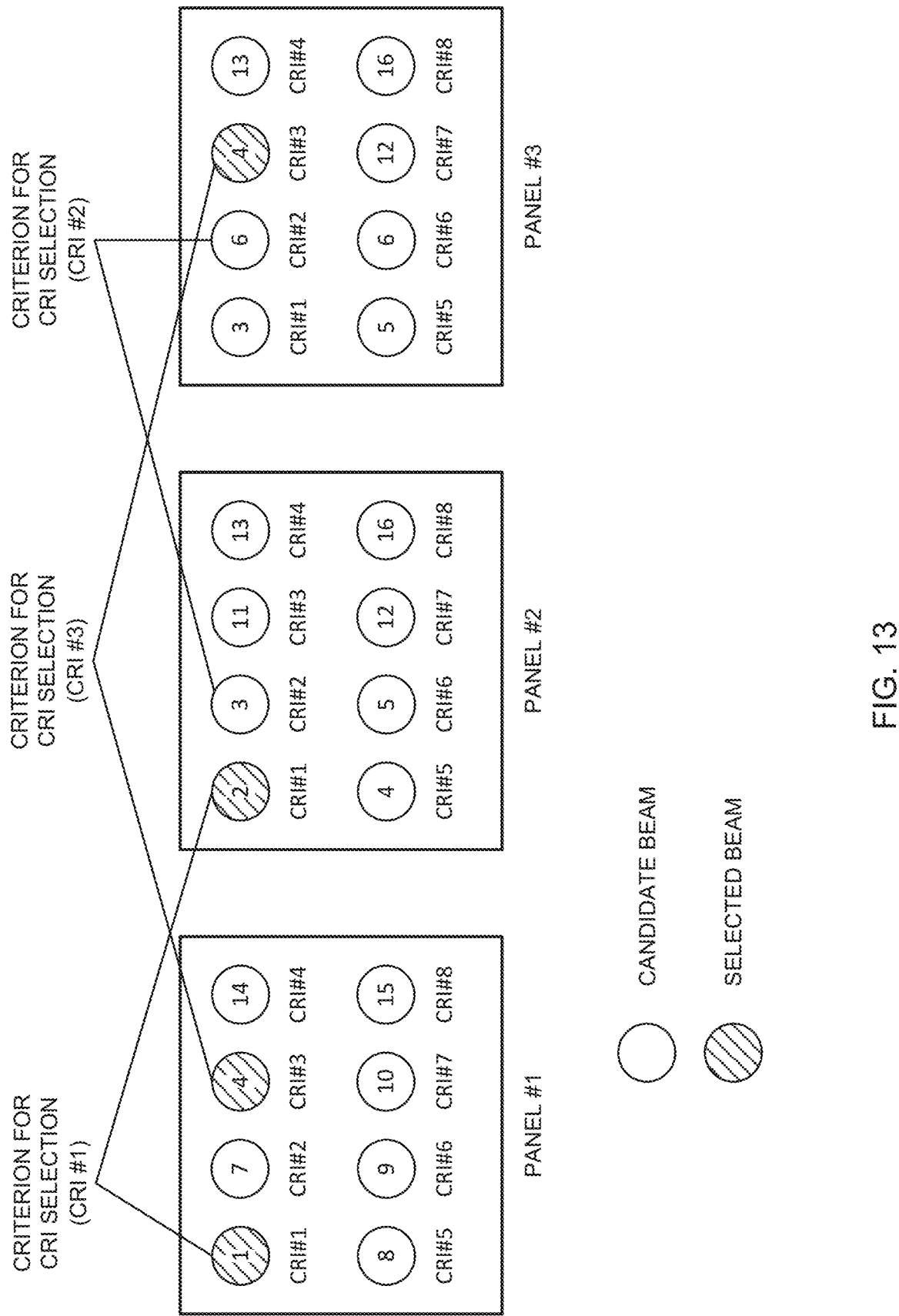
FIG. 13 is a diagram to show an example of report beam selection of the UE according to Embodiment 4.2.

FIG. 13 is a diagram to show an example of report beam selection of the UE according to Embodiment 4.2. FIG. 13 shows an example similar to that of FIG. 12.

The UE compares the average value of X (X=2) best beams regarding each of CRIs #1 to #8. For example, the average value of two best beams of CRI #1 corresponds to the average value of the strength value 1 of panel #1 and the strength value 2 of panel #2. The average value of two best beams of CRI #2 corresponds to the average value of the strength value 3 of panel #2 and the strength value 6 of panel #3. The average value of two best beams of CRI #3 corresponds to the average value of the strength value 4 of panel #1 and the strength value 4 of panel #3.

As a result of the comparison, the UE determines that M (M=2) CRIs having a better average value are CRIs #1 and #3.

Regarding selected CRI #1, the UE compares the strength value 1 of panel #1, the strength value 2 of panel #2, and the strength value 3 of panel #3, and selects the beams of K (K=2) best panels (the beam of panel #1 having the strength value 1 and the beam of panel #2 having the strength value 2).

Regarding selected CRI #3, the UE compares the strength value 4 of panel #1, the strength value 11 of panel #2, and the strength value 4 of panel #3, and selects the beams of K (K=2) best panels (the beam of panel #1 having the strength value 4 and the beam of panel #3 having the strength value 4).

According to Embodiment 4 described in the above, regarding M CRIs/SSBRIs that are assumed to be the best, the beams related to K best panels can be reported. The base station can appropriately determine appropriate beams and panels, based on the CSI report.

<Additional Notes>

"N", "K", "M", and "X" described in the above of the present disclosure may each be referred to as a first number (threshold), a second number (threshold), a third number (threshold), a fourth number (threshold), or the like.

Note that, in each embodiment described above, the panels for beam selection may be limited to be less than all of the panels of the UE. For example, regarding the UE, the panel for beam selection may be a panel that is configured for the UE as a CSI report target (for example, to which the panel ID is reported) may be an activated panel, or may be a panel related to an activated CSI resource set or an activated CSI-RS resource. In other words, the "panel" in each embodiment described above may be interchangeably interpreted as an activated panel, an active panel, or the like.

FIG. 14 is a configuration example showing whether each panel is enabled or disabled. FIG. 14 shows a configuration of a case in which Panel #1 and Panel #4 are disabled (deactivated) and Panel #2 and Panel #3 are enabled (activated). Enabled/disabled of each panel may be configured (indicated, activated) for the UE, based on higher layer signaling (for example, RRC signaling or the MAC CE), physical layer signaling (for example, DCI), or a combination of these.

Note that the UE may assume that, when a field for the panel ID is included in the CSI report, the field is configured to be capable of expressing all of the IDs (panel IDs) used for identifying the panels, regardless of whether the panels are enabled or disabled. Note that, in the present disclosure, the panel ID may be a new ID, or may be another reference signal resource ID (or a resource set ID) (for example, an SRS resource ID/SRS resource set ID).

FIG. 15A is the first example showing mapping of the panel IDs of the CSI report target. As shown in FIG. 15A, the UE may map values of the field for the panel ID to all of the panels.

At the same time, the UE may assume that the field for the panel ID of the CSI report is configured to be capable of expressing the panel IDs of the panels being enabled, in consideration of whether the panels are enabled or disabled.

FIG. 15B is the second example showing mapping of the panel IDs of the CSI report target. As shown in FIG. 14, it is assumed that enabled panels are Panel #2 and Panel #3. In this case, as shown in FIG. 15B, the UE maps values of the field for the panel ID to Panel #2 and Panel #3, and does not map values of the field for the panel ID to Panel #1 and Panel #4 being disabled. According to the configuration of FIG. 15B, the number of bits of the field indicating the panel ID can be appropriately reduced.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 16:
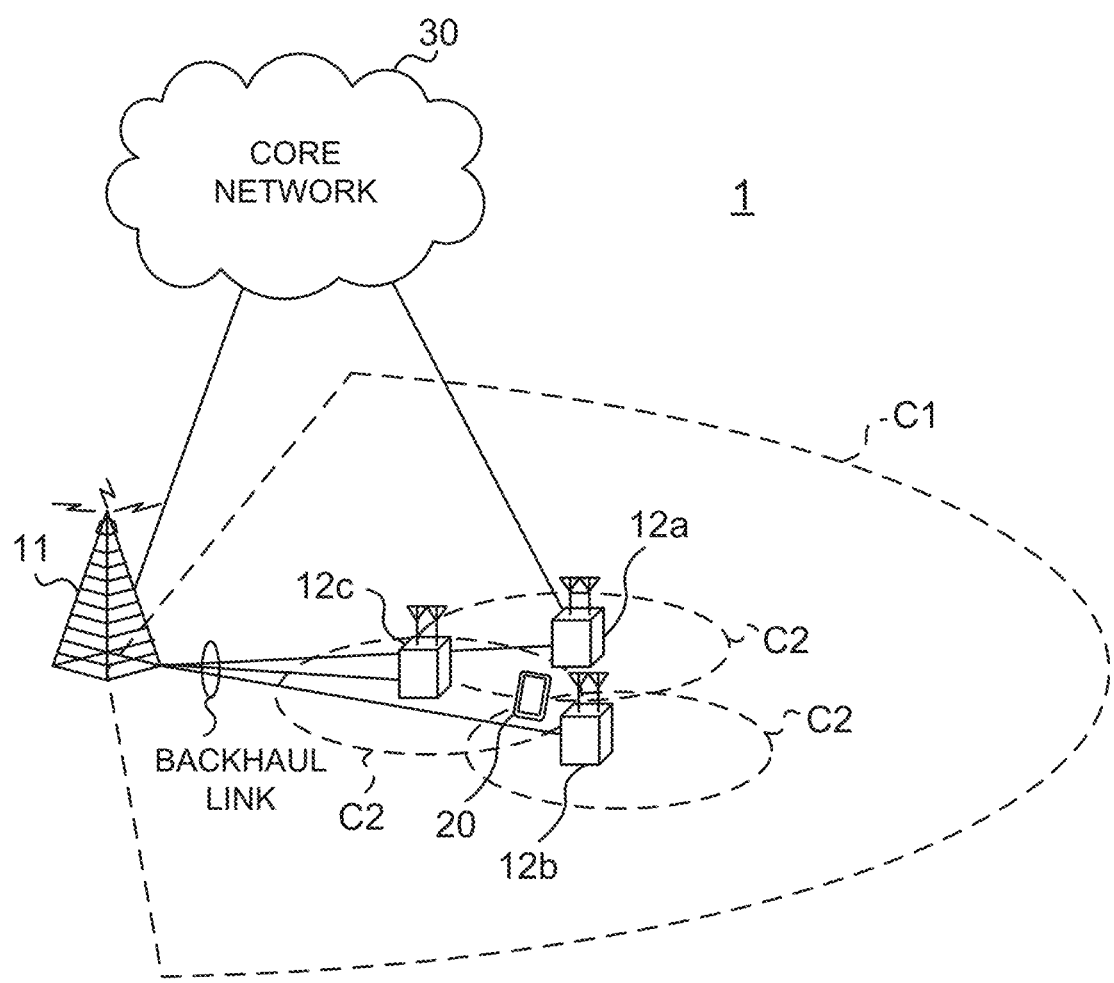
FIG. 16 is a diagram to show an example of a schematic structure of a radio communication system according to one embodiment.

FIG. 16 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 17:
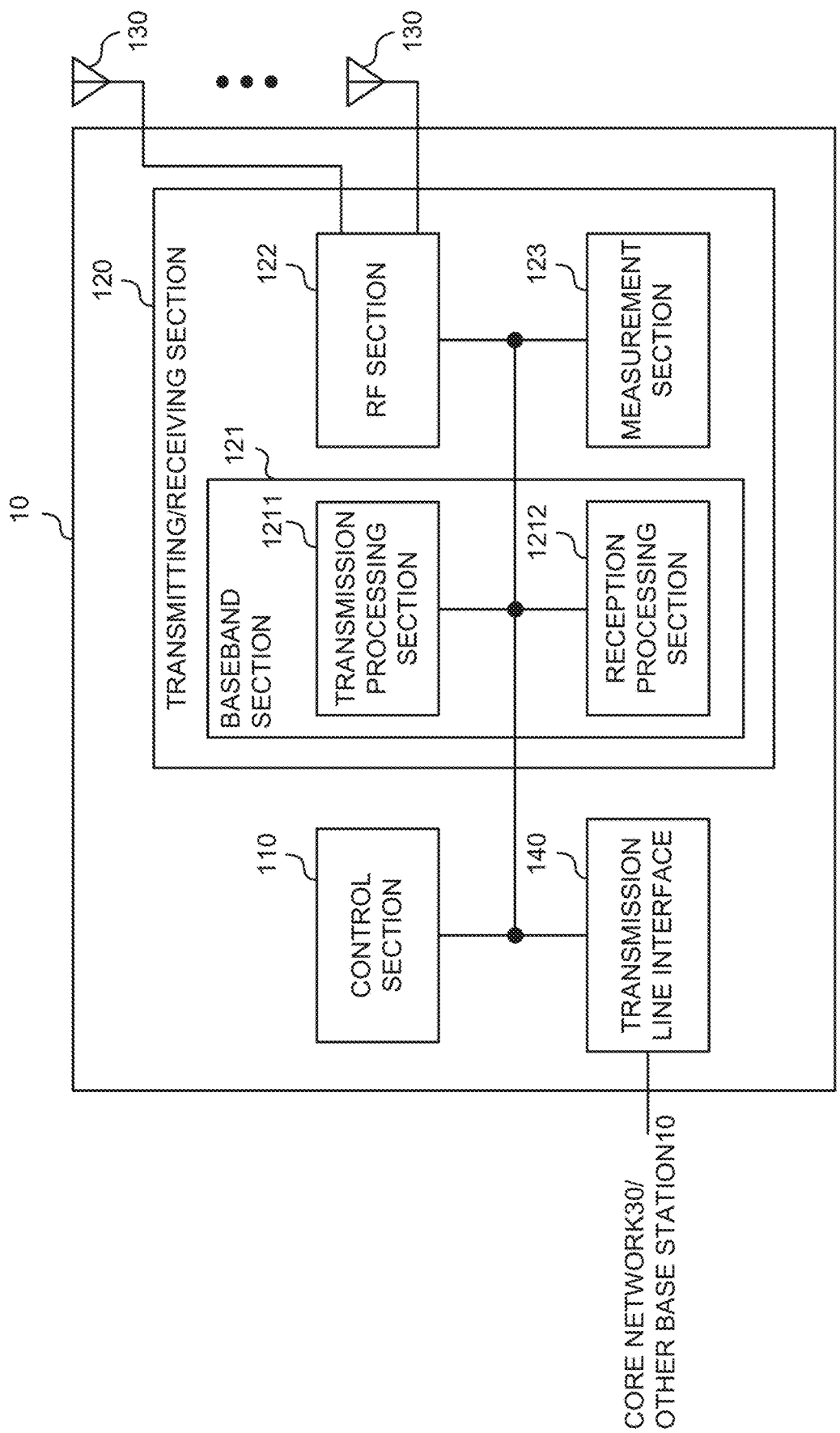
FIG. 17 is a diagram to show an example of a structure of a base station according to one embodiment.

FIG. 17 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a reference signal (for example, the CSI-RS) for channel state information (CSI) measurement regarding a plurality of panels of the user terminal 20. Further, the transmitting/receiving section 120 may receive results of the CSI measurement related to at least one of the plurality of panels from the user terminal 20.

(User Terminal)

Figure 18:
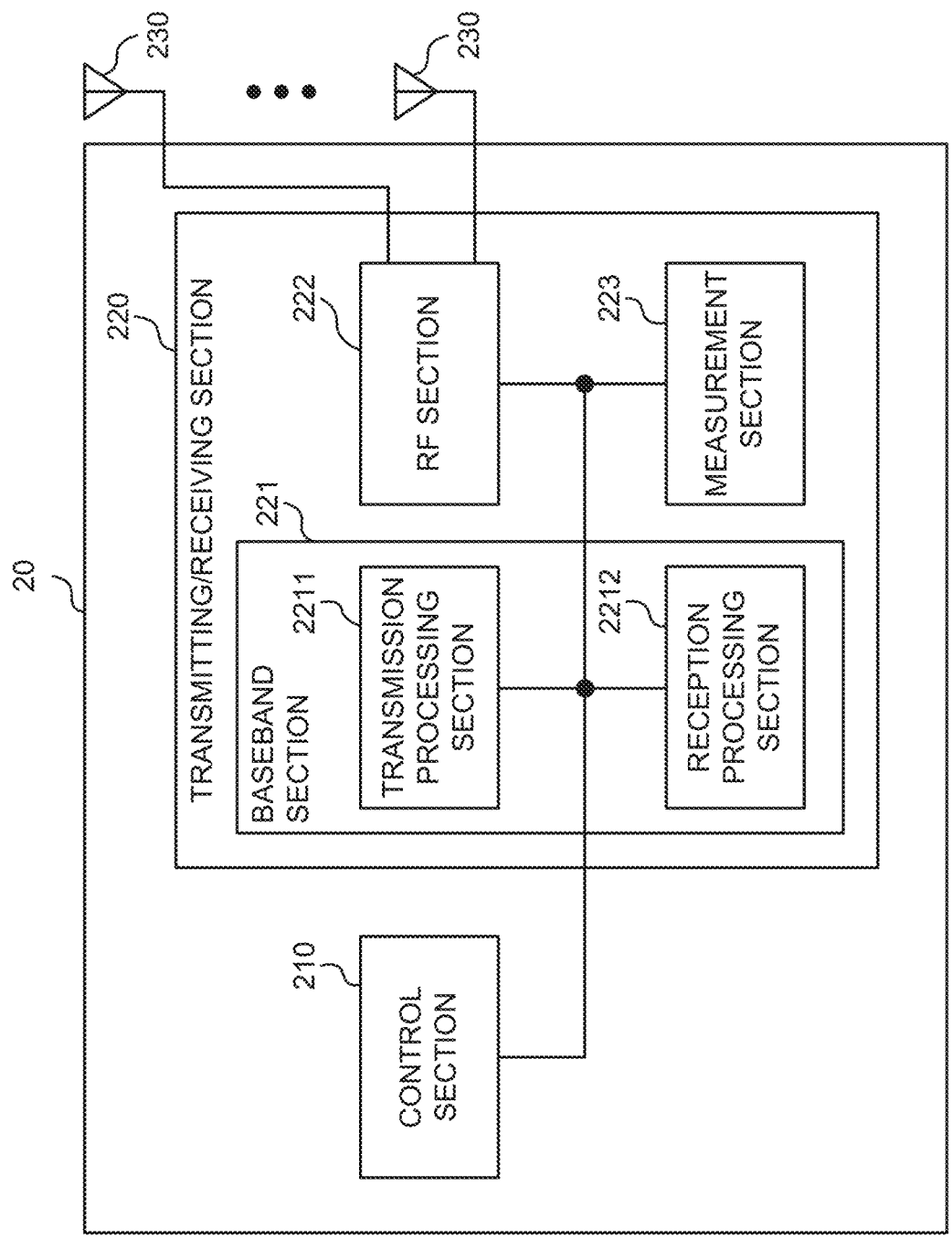
FIG. 18 is a diagram to show an example of a structure of a user terminal according to one embodiment.

FIG. 18 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may perform channel state information (CSI) measurement regarding a plurality of panels.

The control section 210 may determine which results of the CSI measurement related to which panel are to be included in a CSI report.

The control section 210 may determine to include, in the CSI report, a first number (for example, N) of best results of the CSI measurement selected from the results of the CSI measurement of all of the panels.

The control section 210 may determine to include, in the CSI report, a first number (for example, N) of best results of the CSI measurement selected from the results of the CSI measurement of one panel.

The control section 210 may determine to include, in the CSI report, a third number (for example, M) of best results of the CSI measurement selected from the results of the CSI measurement of a second number (for example, K) of best panels regarding each of the second number of best panels.

The control section 210 may select a third number (for example, M) of best CRIs/SSBRIs, and determine to include, in the CSI report, a second number (for example, K) of best results of the CSI measurement selected from the results of the CSI measurement regarding each CRI/SSBRI regarding each of the third number of best CRIs/SSBRIs.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 19:
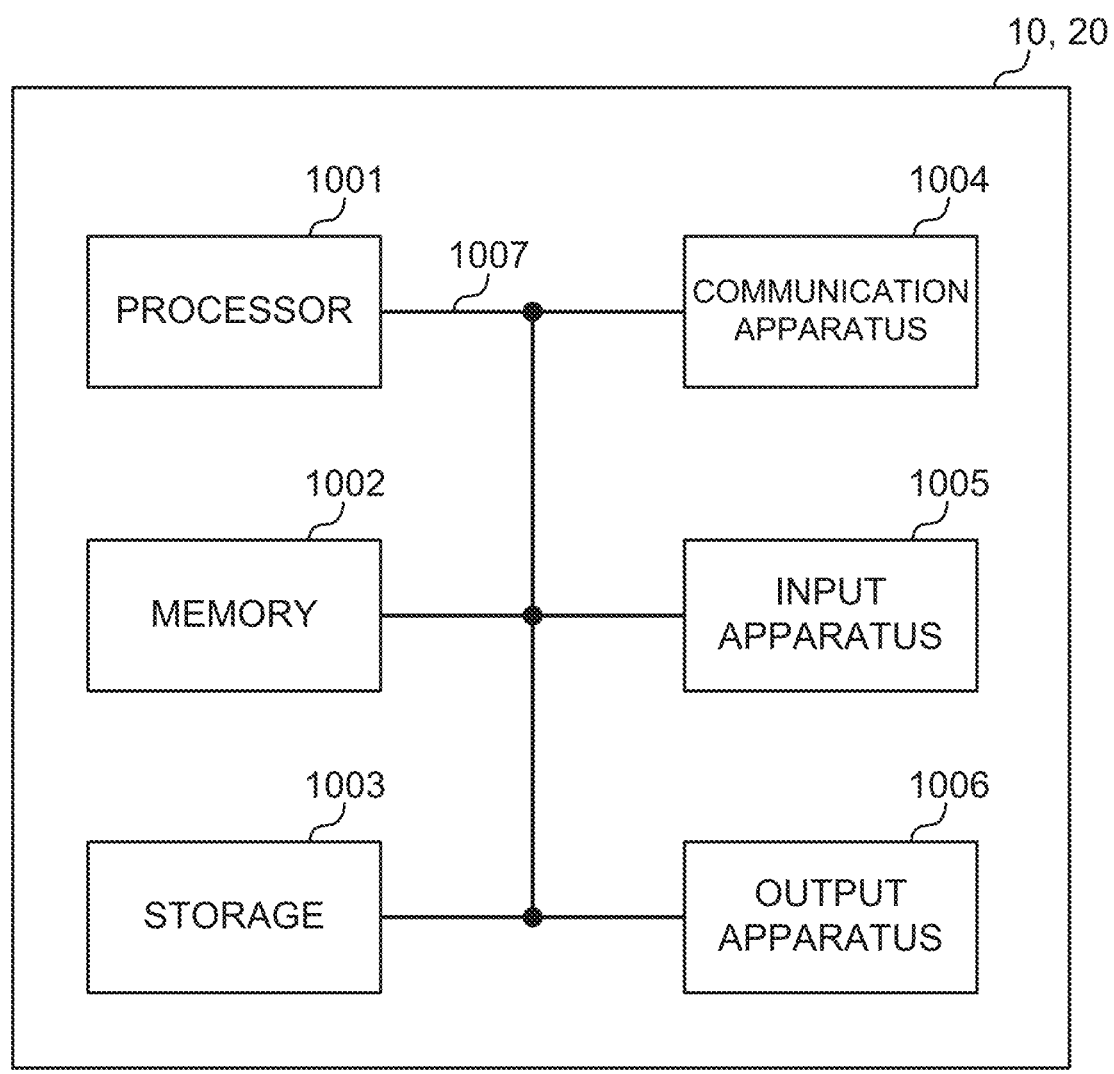
FIG. 19 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 19 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NY), Future generation radio access (FK), Global System for Mobile communications (GSM (registered trademark)), CDMA 2000, Ultra Mobile Broadband (UMB), IEEE 802.11 (Wi-Fi (registered trademark)), IEEE 802.16 (WiMA. (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a processor that selects, from multiple panels, multiple beams including a beam with largest reference signal received power (RSRP); and
   a transmitter that transmits a channel state information (CSI) report including multiple resource indicators respectively corresponding to the multiple beams, multiple RSRPs respectively corresponding to the multiple beams, and multiple panel identifiers (IDs) respectively corresponding to the multiple beams,
   wherein a value of each panel ID is mapped to one of a panel that is enabled and a panel that is disabled.

2. The terminal according to claim 1, wherein the processor determines, based on higher layer signaling, a number of the multiple beams to be selected.

3. A radio communication method for a terminal, comprising:
   selecting, from multiple panels, multiple beams including a beam with largest reference signal received power (RSRP); and
   transmitting a channel state information (CSI) report including a resource indicator corresponding to each of the multiple beams, RSRP corresponding to each of the multiple beams, a panel identifier (ID) corresponding to each of the multiple beams,
   wherein a value of each panel ID is mapped to one of a panel that is enabled and a panel that is disabled.

4. A system comprising a terminal and a base station, wherein
   the terminal comprises:
      a processor that selects, from multiple panels, multiple beams including a beam with largest reference signal received power (RSRP); and
      a transmitter that transmits a channel state information (CSI) report including a resource indicator corresponding to each of the multiple beams, RSRP corresponding to each of the multiple beams, a panel identifier (ID) corresponding to each of the multiple beams, and
   the base station comprises:
      a receiver that receives the CSI report, wherein
   wherein a value of each panel ID is mapped to one of a panel that is enabled and a panel that is disabled.

* * * * *